United States Patent Office 3,278,902
Patented Oct. 11, 1966

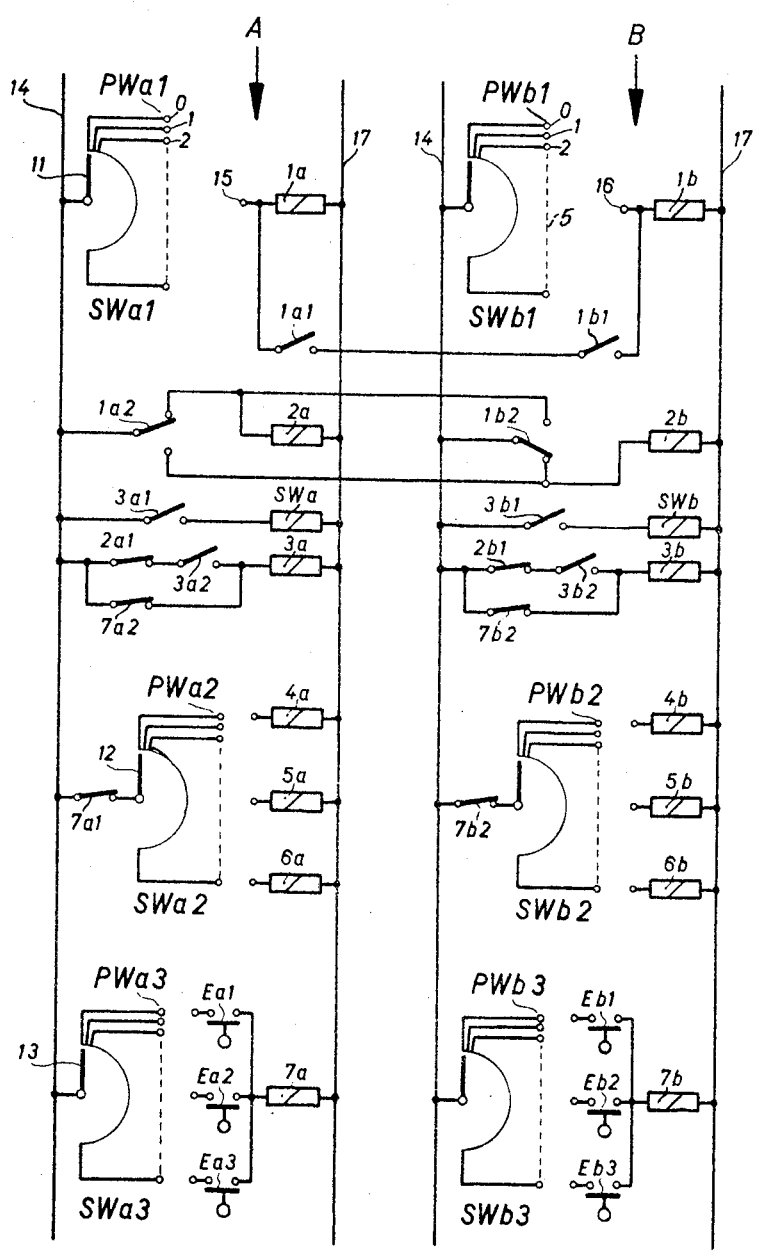

3,278,902
CONTROL DEVICE FOR WORKING MACHINES
Fritz Zollinger, Rumlang, Zurich, Switzerland, assignor to Machine-Tool Works Oerlikon, Administration Company, Zurich-Oerlikon, Switzerland
Filed Aug. 29, 1962, Ser. No. 220,318
Claims priority, application Switzerland, Sept. 1, 1961, 10,197/61
2 Claims. (Cl. 340—147)

The present invention relates to a control device for working machines, particularly of machine tools, for which step-by-step motion devices are provided effecting a step-by-step motion from one stage to the next stage, in response to command impulses of a program stored in a program storage means whereupon the various functions of the machine, such as carriage movements, indexing of turrets, control of rotational speeds are switched on and off again, in the sequence prescribed.

Such a program concerns in general a single tool, but may alternatively concern several tools simultaneously in operation.

For example, turner's lathes are known, which have one or more additional tool carriages. As long as the tools of these additional carriages perform cycles of uncomplicated shape, such as grooving operations, the simultaneous operation of the main carriage as well as of the additional carriages is easy. However, the programming becomes difficult, when for example two carriages, each carrying a tool are present.

These difficulties may be circumvented by providing for each tool carriage a program control of its own. In spite of the inherently desirable separation of the programs, however, a certain coordination must be possible, since the ranges of operation of two tools often overlap, and a collision of the tools has to be prevented. In another case it may happen for example that several tools have to work simultaneously at greatly differing diameters which is not permissible if each of them should operate at the optimum cutting speed.

Hitherto such controls of two programs each of which has a program selector and a step-by-step switch, have been coordinated with one another in such a manner that the step-by-step control was effected simultaneously through a common actuating device for both step-by-step switches. This meant however a loss in program volume for that program, which is holding up its machine functions, owing to some control steps being used only for the purpose of advancing to the next step, and consequently not being available for being charged with other functions. Moreover the two programs were closely tied to one another by the common step-by-step motion.

The present invention has the primary object of dispensing with interference by an operator, and moreover of making the starting and the interrupting of the courses of programs automatic by means of a particularly simple device which obviates the aforesaid disadvantages.

With this and other subjects in view which will become apparent later in this specification and the accompanying drawing, I provide a control device for working machines having two program controls of substantially identical construction, each comprising a program selector and a step-by-step switch, and connected with one another in such a manner that the advance of the step-by-step switch of one program control remains interrupted at the stage pre-selected by its program selector until the step-by-step switch of the other program control has reached a stage pre-selected by its program selector, and each of said program controls comprising a first auxiliary relay, a second auxiliary relay, a supply line to said second auxiliary relay and a change-over switch connected in said supply line, said first auxiliary relay upon the preselected stage of its program control being reached by its associated step-by-step switch effecting the switching over of said change-over switch to a position kept up until said other program control, having reached the stage preselected by its own program selector, leaves said stage.

Accordingly the change-over switch controlled by the first auxiliary relay in a first position energises the second auxiliary relay of its own program control, and in a second position energises the second auxiliary relay of the other program control.

Moreover the arrangement is made in such a manner that the second auxiliary relay of each of the two program controls controls a switching device, which keeps the step-by-step switch of its own program in an operative position by a self-holding line of a release-relay belonging to this switching device, and thereby prevents the advance of the step-by-step switch until the other program control reaches its preselected stage and thereby energises its first auxiliary relay.

Moreover provision is made, that upon the second program control reaching its preselected stage its energised first auxiliary relay performs the switching over of the change-over switch belonging to this program and subsequently energises the second auxiliary relay of the other program control and thereby abolishes the self-holding of its release relay.

A further feature of this control device consists in that the supply line of the first auxiliary relay of the first program control is connected with the supply line of the first auxiliary relay of the second program control by a self-holding line, wherein two make contacts, each associated with one of the two first auxiliary relays, are arranged in series with one another for self-holding the first auxiliary relay of the first-mentioned program control.

In order that the invention may be clearly understood an embodiment thereof will now be described by way of example with reference to the accompanying drawing, the single figure of which shows a circuit diagram of a control device according to the invention using very simple circuit elements such as relays, change-over switches, self-holding means, instead of whole groups of circuit elements.

In the circuit diagram two program controls A and B are illustrated which are completely identical in their arrangement. Both are connected in common through supply lines 14 and 17 to a source of voltage (not shown).

The following description applies likewise to both controls.

A step-by-step switch is connected with switching levels SW$a$ 1, SW$a$ 2, SW$a$ 3 to the program selectors PW$a$ 1, PW$a$ 2 and PW$a$ 3.

On the program selector PW$a$ 3 the reply switches E$a$ 1–3 are attached by means of plug-in cables in accordance with the program to be executed.

These reply switches E$a$ 1, E$a$ 2, E$a$3 are for example constructed as limit switches on machine carriages, which are operable by the aid of adjustable cams at any desired places of the carriage path, and which signal the execution of an order given at a stage of the program.

The reply switches lie in series to the coil of a reply relay 7$a$, the rest contact 7$a$ 1 of which lies before the switching arm of the step-by-step switch level SW$a$ 2.

To the program selector PW$a$ 2 the switching relays 4$a$, 5$a$ and 6$a$ are connected by means of plug-in flexes in accordance with the pre-determined program, which relays switch on and off the functions of the machine, i.e., for example the movements of the carriage in a known manner not shown.

A rest contact 7$a$ 2 of the reply relay 7$a$ is arranged in the supply line of the release relay 3$a$, which by means of its contact 3*a* 1 controls the coil SW*a* of the step-by-step switch.

The step-by-step motion mechanism is of a kind, in which the advance of the contact arm takes place only after the de-energizing of the previously energized step-by-step switching coil SW*a* (which is known and commercially available).

In the supply line of the release relay 3*a* there are arranged in parallel to the rest contact 7*a* 2 a self-holding contact 3*a* 2, and in series with the latter, a rest contact 2*a* 1 of an auxiliary relay 2*a*.

With the program selector PW*a* 1 likewise the first auxiliary relay 1*a* is connected by a plug-in cable in accordance with the program. The supply line to the auxiliary relay 1*a* has a connection with the auxiliary relay 1*b* of the program control B, wherein the contacts 1*a* 1 and 1*b* 1 are connected in series.

The contact arm of the change-over switch 1*a* 2 of the first auxiliary relay 1*a* is so arranged that in its rest position it connects a second auxiliary relay 2*a* to a source of voltage, and in its operative position supplies the second auxiliary relay 2*b* of the program control B with current.

The manner of functioning of the control device is as follows:

A program control consists substantially of a step-by-step switching mechanism, which in the present embodiment is constructed as a step-by-step switch, actuated by the coil SW*a* and SW*b*, respectively, and in whose various switching levels SW*a* 1, SW*a* 2 and SW*a* 3—(any further reference to the corresponding elements of the program control B, which is completely identical will be dispensed with hereinafter)—an electrical connection is successively established between the voltage supply 14 and the contacts 0, 1, 2 . . . of the program selectors PW*a* 1, PW*a* 2 and PW*a* 3 by means of mechanically interconnected contact arms 11, 12, 13.

By means of plug-in cable connections it has been preselected what machine functions are to be included at any stage, and at what point the switching to the next stage should be carried out.

For example the switching relays 4*a* and 5*a* may switch on the rapid transverse advance and rapid transverse return, respectively, and the relay 6*a* the longitudinal advance. For further machine functions, e.g., variations in the rotational speed of the spindle etc., further relays are required which for the sake of clarity are not shown in the FIGURE.

Each of the reply switches E*a* 1, E*a* 2 and E*a* 3 diagrammatically shown opposite the program selector PW*a* 3 symbolizes a limit switch existing on the machine, the actuation of which signals the completion of an order. Thus, by the aid of limit switches and cams it may for example be reported back, when a carriage has reached a certain position. All return-signal switches act in unison on the reply relay 7*a* the energizing of which breaks the circuit before the step-by-step level SW*a* 2 by the rest contact 7*a* 1 and thereby switches off the machine functions which had been switched on by the aid of the switching relays 4*a*, 5*a* and 6*a*, and at the same time by opening the rest contact 7*a* 2 in the supply line to the release relay 3*a* effects the opening of 3*a* 1, and thus effects the advancing of the step-by-step switch SW*a*. Since the reply switches E*a* 1 . . . report the completion of an operation, there is necessarily always an open reply switch in every new switched-on stage, so that the reply relay 7*a* drops off immediately after any advance steps, and switches on the preselected machine function through 7*a* 1. Also 7*a* 2 returns to the rest position, so that the release relay 3*a* is energized and through 3*a* 1 prepares a new position of the step-by-step switch. The self-holding contact 3*a* 2 before the release relay 3*a* is ineffective as long as the rest contact 2*a* 1 of the auxiliary relay 2*a* is normally open.

In this manner the programs of both program controls are advanced step-by-step independently of one another from one stage to the other.

If it is then desired that for example the program A should keep at a standstill after the execution of the stage 2, until the program B has reached for example the 5th stage, in the program control A the bushing 2 on the step-by-step switch level SW*a* 1 is connected with bushing 15, and in the program control B the bushing 5 of the step-by-step switch level SW*b* 1 is connected with the bushing 16.

When for example the program A proceeds at a quicker rate than the program B, firstly the auxiliary relay 1*a* in the program control A is kept energized upon reaching the 2nd stage, since a transmission flex may be plugged-in there. This has the effect of switching-over the change-over switch 1*a* 2, whereby the second auxiliary relay 2*a* drops off and closes the contact 2*a* 1.

Since by the switching-over from stage 1 to stage 2, as described, the return-signal relay 7*a* has dropped off again, the switch 7*a* 2 is closed, and accordingly the release relay 3*a* is energized, and the step-by-step switch SW*a* is energized in readiness for advancing another step at the next interruption of voltage supply.

However, since the contact 2*a* 1 is then closed, the release relay 3*a* holds itself through the self-holding line, until 2*a* 1 is opened. The advance of the program is thus blocked.

The functions programmed in stage 2 continue until according to the program one of the reply switches reports that the point desired has been reached, and through the reply relay 7*a* and relay contact 7*a* 1 puts the corresponding machine function out of action. The program control A remains in this position until the program control B reaches 5th stage. At this moment the auxiliary relay 1*b* is energized, and the change-over switch 1*b* 2 energizes the auxiliary relay 2*a*, whereby the contact 2*a* 1 opens, interrupts the self-holding of the release relay 3*a* and initiates the further advance of the program A.

The auxiliary relays 1*a* and 1*b* are provided with a common self-holding, which has the effect, that the auxiliary relay 1*a* energized first remains in the energized condition even after the further advance of the program control A, and keeps the circuit of the auxiliary relay 2*b* supplied with current through 1*a* 2. Otherwise any advance of the program control B would be impossible.

By the switching-over of the change-over switch 1*b* 2 the auxiliary relay 2*b* is accordingly left unaffected, since the coil 2*b* at this stage is energized through the change-over switch 1*a* 2. Consequently, the program B may advance unhampered.

As soon as this is done in the manner described hereinabove, i.e., as soon as the contact arm of the step-by-step switch of the switching bank SW*b* 1 advances from the 5th to the 6th stage, the auxiliary relay 1*b*, and owing to the opening of contact 1*b* 1, also the auxiliary relay 1*a* drop off. The change-over switches 1*a* 2 and 1*b* 2 then return to their rest position.

Both program controls thereafter continue working independently of one another, until one of them has reached the next point of interruption in the program.

Since the circuit diagram with the auxiliary relays 1*a* and 1*b* as well as 2*a* and 2*b* is laid out completely symmetrically, the course of events described occurs in the reverse, when the program control B for example is the first one to reach the 5th stage. In this case the program B is blocked until the program A has reached the second stage.

It is irrelevant for the manner of functioning of the device for the co-ordination of two program controls according to the present invention, how the program controls are constructed in detail. In particular, by the aid of the device described, program controls can be co-ordinated without difficulty, the circuit lay outs of which differ from one another in the parts concerning the functions to be controlled.

While I have herein described and illustrated in the accompanying drawing what may be considered a typical and particularly advantageous embodiment of my said invention I wish it to be understood that I do not limit myself to the details and dimensions described and illustrated; for obvious modifications will occur to a person skilled in the art.

What I claim as my invention and desire to secure by Letters Patent, is:

1. A control device for tool machines comprising two program control units, each control unit comprising a step-by-step switch with stepping switch means, a plurality of contacts and a switch arm, said arm making a switching step between two contacts of said plurality of contacts upon actuation of said stepping switch means, an electrical switching mechanism for the automatic successive actuation of said stepping switch means, a first relay comprising contact means connected with said electrical switching mechanism so that upon energizing said first relay means said stepping switch means comes under the influence of said electrical switching mechanism and upon deenergizing said first relay means said stepping switch means becomes independent of said electrical switching mechanism, a second relay means having a pair of auxiliary relays each having a stationary contact and a working contact; an energizing circuit for said first relay means, comprising one of said auxiliary relays to actuate said first relay means by way of its stationary contact, electrical connecting means for selective connection of said second relay means with a selected contact of said plurality of contacts to actuate said second relay means upon contact of said switching arm with a contact connected to said connecting means, a connection between a working contact of one of said relays with the stationary contact of the other one of said relays to form a further actuating circuit for said first relay means.

2. A control device for tool machines comprising two program control units, each control unit comprising a first and a second step-by-step switch, each of said switches having a contact bank and a contact arm movable over the contacts of said contact bank, electrical stepping switch means for the common stepwise actuation of said contact arm of each of said step-by-step switches, a set of independently actuated auxiliary switches, each of said auxiliary switches being connected to a single contact of said contact bank of said first step-by-step switch; an electrical control mechanism for the actuation of said stepping switch means comprising electrical auxiliary relay means having a switch contact electrically connected with said stepping switch means, actuating circuits for said auxiliary relay means containing said contact arm with said contact bank of said first step-by-step switch and also said sets of auxiliary switches, in order to actuate sail auxiliary relay means upon actuation of one of said auxiliary switches and by a movement, effected by said stepping switch means, of said switch arm of said first step-by-step switch on the contact of said contact bank of the last named step-by-step switch, which contact corresponds to the last named auxiliary switch; a first main relay means comprising contact means electrically connected with said switch contact, said contact means comprising a rest position in which latter the contact means of said switch contact short circuits to prevent actuation of said stepping switch means by means of said electrical switch mechanism; a second main relay means provided with a rest contact and an operating contact, said rest contact being connected to said first main relay means to actuate the latter when said second main relay means are not energized, electrical connecting means for selective connection of said second main relay means with a selected contact of said contact bank of said second step-by-step switch to actuate said second main relay means by movement of the control arm of said second step-by-step switch effected by said stepping switch means on said selected contact, a connection between each of said operating contacts of said relay of one of said two control units with the rest contact of said relay of the other of said control units to actuate said first main relay means for said two control units.

References Cited by the Examiner
UNITED STATES PATENTS

| | | | |
|---|---|---|---|
| 2,799,811 | 7/1957 | Lindars | 307—141.4 |
| 2,898,483 | 8/1959 | Muller | 340—147 |
| 3,013,166 | 12/1961 | Dunlap | 340—147 |

NEIL C. READ, *Primary Examiner.*

LLOYD McCOLLUM, *Examiner.*

P. XIARHOS, *Assistant Examiner.*